United States Patent
Nagaraj et al.

(10) Patent No.: US 11,119,516 B2
(45) Date of Patent: Sep. 14, 2021

(54) SOLENOID-OPERATED PRESSURE-REGULATOR MODULES FOR INFLATION SYSTEMS AND METHODS THEREOF

(71) Applicant: Goodrich Corporation, Charlotte, NC (US)

(72) Inventors: Badarinath Nagaraj, Chintamani (IN); Poly Puthur John, Kerala (IN)

(73) Assignee: GOODRICH COPRORATION, Charlotte, NC (US)

( * ) Notice: Subject to any disclaimer, the term of this patent is extended or adjusted under 35 U.S.C. 154(b) by 37 days.

(21) Appl. No.: 16/782,258

(22) Filed: Feb. 5, 2020

(65) Prior Publication Data

US 2021/0181773 A1    Jun. 17, 2021

(30) Foreign Application Priority Data

Dec. 11, 2019   (IN) .............................. 201911051313

(51) Int. Cl.
    *B64D 25/14*    (2006.01)
    *G05D 16/20*    (2006.01)

(52) U.S. Cl.
    CPC ......... *G05D 16/2097* (2019.01); *B64D 25/14* (2013.01)

(58) Field of Classification Search
    CPC .............. B64D 25/14; Y10T 137/3584; Y10T 137/87917; F17C 2205/0326; F16K 31/402; G05D 16/2033
    See application file for complete search history.

(56) References Cited

U.S. PATENT DOCUMENTS

| | | | | |
|---|---|---|---|---|
| 2,398,775 A | * | 4/1946 | Beekley | F16K 31/42 251/26 |
| 3,980,270 A | * | 9/1976 | Thomas | A62C 35/02 251/30.01 |
| 4,624,441 A | | 11/1986 | Kreitchman et al. | |
| 6,321,770 B1 | * | 11/2001 | Hintzman | B64D 25/14 137/68.23 |
| 10,946,971 B2 | * | 3/2021 | John | B64D 25/14 |
| 2010/0018585 A1 | * | 1/2010 | Pavin | G05D 16/2095 137/66 |
| 2017/0203849 A1 | * | 7/2017 | John | B64D 25/14 |

(Continued)

*Primary Examiner* — Robert K Arundale
(74) *Attorney, Agent, or Firm* — Cantor Colburn LLP (57) ABSTRACT

Solenoid-operated pressure-regulator modules, aircraft inflatable slide assemblies, and methods for assembling solenoid-operated pressure-regulator modules are described. The solenoid-operated pressure-regulator modules include a primary inflation valve, a secondary inflation valve, a secondary valve actuator, a solenoid, an inflatable slide, and a gas source. The solenoid-operated pressure-regulator modules are configured to selectively enable a fluid connection between a gas source and an inflatable slide to enable inflation of the inflatable slide. The primary inflation valve includes a main cavity, a command cavity, an inlet through which a gas enters the main cavity, an outlet, a poppet that controls a gas flow from the inlet to the outlet, and a valve divider separating the main cavity from the command cavity. The secondary inflation valve is fluidly coupled to the outlet of the primary inflation valve. The primary and secondary inflation valves are configured to be simultaneously operated by operation of the solenoid.

20 Claims, 7 Drawing Sheets

(56) References Cited

U.S. PATENT DOCUMENTS

| | | |
|---|---|---|
| 2018/0231137 A1 | 8/2018 | John et al. |
| 2018/0231185 A1 | 8/2018 | John et al. |
| 2018/0341279 A1 | 11/2018 | John et al. |
| 2019/0120404 A1 | 4/2019 | John |
| 2019/0249789 A1 | 8/2019 | John et al. |
| 2019/0353263 A1* | 11/2019 | John ................ F16K 31/42 |
| 2020/0094976 A1* | 3/2020 | John ................ A62B 1/20 |
| 2020/0300380 A1* | 9/2020 | John ................ F16K 1/12 |
| 2020/0326014 A1* | 10/2020 | John ................ F16K 31/42 |
| 2020/0393056 A1* | 12/2020 | Khare ............... F16K 1/303 |

* cited by examiner

SOLENOID-OPERATED PRESSURE-REGULATOR MODULES FOR INFLATION SYSTEMS AND METHODS THEREOF

CROSS REFERENCE TO RELATED APPLICATIONS

This application claims the benefit of Indian Provisional Application No. 201911051313, filed Dec. 11, 2019, the disclosure which is incorporated herein by reference in its entirety.

BACKGROUND

Embodiments of the present disclosure pertain to the art of valves and, in particular, to solenoid-operated pressure-regulator modules for aircraft inflation systems and methods for manufacturing solenoid-operated pressure-regulator modules. The solenoid-operated pressure-regulator modules described herein can be used, for example, to control a flow pressure of a gas during an inflation process of emergency inflatable evacuation slides, such as used on an aircraft.

During an aircraft emergency, such as at take-off or landing, swift removal of passengers from the aircraft may be required due to the potential for injuries to the passengers. A conventional method of quickly evacuating a large number of passengers from an aircraft is to provide multiple emergency exits, each of which is equipped with an inflatable slide. Inflatable slides are normally stored in an undeployed and uninflated condition in a housing, requiring a minimum of space in the interior of the aircraft. Typically, such housed or stored inflatable slides are mounted on or adjacent to an interior of an aircraft door.

In general, a system for inflating an inflatable slide consists of a pressurized cylinder, an inflation valve, a regulating valve, high pressure hoses, and aspirators. The cylinder is typically filled with a pressurized gas, such as nitrogen, or a mixture of carbon dioxide and nitrogen. In some designs, the inflatable slide is stored in an undeployed and uninflated condition within an aircraft door. In such configurations, when the aircraft door is opened, a pack containing the slide will fall free of a door bustle (i.e., a semi-rigid outer container) and the weight and momentum of the inflatable slide will pull on a lanyard attached to the inflation valve, to thus deploy and inflate the inflatable slide. Such operation is considered an automatic operation or deployment. However, a manual backup or secondary operation may be arranged to ensure proper deployment of the inflatable slide. For example, a manual pull cable can be configured to enable the initiation of the flow of gas to inflate the inflatable slide. Inflation systems that are actuated by such manual pull cables can leak gas into the undeployed inflatable slide or otherwise lose a portion of the gas stored within the pressurized cylinder. These inflation systems can be unreliable and are often larger than desired, ultimately reducing performance and/or increasing the weight of such systems.

BRIEF DESCRIPTION

According to some embodiments, solenoid-operated pressure-regulator modules for actuation of two inflation valves by use of a single solenoid valve are provided. The solenoid-operated pressure-regulator modules are configured to enable inflation of an inflatable slide on an aircraft. The solenoid-operated pressure-regulated modules include a primary inflation valve, a secondary inflation valve, a secondary valve actuator, and a solenoid. The primary inflation valve includes a main cavity, a command cavity, an inlet through which a gas enters the main cavity, an outlet, a poppet that controls a gas flow from the inlet to the outlet, and a valve divider separating the main cavity from the command cavity. The secondary inflation valve is fluidly coupled to the outlet of the primary inflation valve. The secondary valve actuator includes an actuator inlet fluidly coupled to an outlet of the command cavity. In a first state, the actuator prevents the opening of the secondary inflation valve and obstructs the gas flow into the secondary inflation valve. In a second state, the actuator allows secondary inflation valve to open. The solenoid controls the gas flow into the command cavity and actuator inlet of the secondary valve actuator to cause the secondary valve actuator to enter the second state. This allows the secondary inflation valve to open and gas flow to flow through the secondary inflation valve.

In addition to one or more of the features described above, or as an alternative, further embodiments of the solenoid-operated pressure-regulator modules may include a pilot pressure conduit connecting the main cavity to the command cavity.

In addition to one or more of the features described above, or as an alternative, further embodiments of the solenoid-operated pressure-regulator modules may include that the solenoid is configured to selectively control the gas flow from the main cavity to the command cavity.

In addition to one or more of the features described above, or as an alternative, further embodiments of the solenoid-operated pressure-regulator modules may include a pressure regulator coupled to an outlet of the secondary inflation valve.

In addition to one or more of the features described above, or as an alternative, further embodiments of the solenoid-operated pressure-regulator modules may include a valve seat arranged on the valve divider. The poppet selectively sealingly engages with the valve seat to prevent the gas from flowing from the main cavity to the outlet of the primary inflation valve.

In addition to one or more of the features described above, or as an alternative, further embodiments of the solenoid-operated pressure-regulator modules may include that the poppet includes a base, a first rod member extending from the base in a first direction and into the main cavity, and a second rod member extending in a second direction from the base through the valve seat and into the command cavity, the solenoid-operated pressure-regulator module may include a piston coupled to the second rod member and disposed in the command cavity.

In addition to one or more of the features described above, or as an alternative, further embodiments of the solenoid-operated pressure-regulator modules may include that the solenoid is configured to be electrically activated.

In addition to one or more of the features described above, or as an alternative, further embodiments of the solenoid-operated pressure-regulator modules may include that the secondary valve actuator further includes an actuator piston having an actuator piston head and an actuator rod member extending from the head and is arranged such that when the secondary valve actuator is in the first state it blocks a secondary inflation valve seal of the secondary inflation valve from moving and allows the secondary inflation valve seal to move when the secondary valve actuator is in the second state.

According to some embodiments, inflatable slide assemblies for use during emergency evacuations of aircraft are provided. The assemblies include an inflatable slide, a gas source, and a solenoid-operated pressure-regulator module arranged between the gas source and the inflatable slide. The solenoid-operated pressure-regulator module is configured to selectively enable a fluid connection between the gas source and the inflatable slide to enable inflation of the inflatable slide. The solenoid-operated pressure-regulator module includes a primary inflation valve, a secondary inflation valve, a secondary valve actuator, and a solenoid. The primary inflation valve includes a main cavity, a command cavity, an inlet through which a gas enters the main cavity, an outlet, a poppet that controls a gas flow from the inlet to the outlet, and a valve divider separating the main cavity from the command cavity. The secondary inflation valve is fluidly coupled to the outlet of the primary inflation valve. The secondary valve actuator includes an actuator inlet fluidly coupled to an outlet of the command cavity. In a first state, the secondary valve actuator prevents the opening of the secondary inflation valve and obstructs the gas flow into the secondary inflation valve. In a second state, the actuator allows the secondary inflation valve to open. The solenoid controls the gas flow into the command cavity and actuator inlet of the secondary valve actuator to cause the secondary valve actuator to enter the second state. This allows the secondary inflation valve to open and gas flow to flow through the secondary inflation valve.

In addition to one or more of the features described above, or as an alternative, further embodiments of inflatable slide assemblies may include a pilot pressure conduit connecting the main cavity to the command cavity.

In addition to one or more of the features described above, or as an alternative, further embodiments of inflatable slide assemblies may include that the solenoid is configured to selectively control fluid flow from the main cavity to the command cavity.

In addition to one or more of the features described above, or as an alternative, further embodiments of inflatable slide assemblies may include a pressure regulator coupled to an outlet of the secondary inflation valve.

In addition to one or more of the features described above, or as an alternative, further embodiments of inflatable slide assemblies may include that a valve seat arranged on the valve divider. The poppet selectively sealingly engages with the valve seat to prevent the gas from flowing from the main cavity to the outlet of the primary inflation valve.

In addition to one or more of the features described above, or as an alternative, further embodiments of inflatable slide assemblies may include that the poppet includes a base, a first rod member extending from the base in a first direction and into the main cavity, and a second rod member extending in a second direction from the base through the valve seat and into the command cavity, the solenoid-operated pressure-regulator module further comprising a piston coupled to the second rod member and disposed in the command cavity.

In addition to one or more of the features described above, or as an alternative, further embodiments of inflatable slide assemblies may include that the solenoid-operated pressure-regulator module and the gas source are arranged as an inflator that is operably connected to the inflatable slide.

In addition to one or more of the features described above, or as an alternative, further embodiments of inflatable slide assemblies may include that the secondary valve actuator further includes an actuator piston having an actuator piston head and an actuator rod member extending from the head and is arranged such that when the secondary valve actuator is in the first state it blocks a secondary inflation valve seal of the secondary inflation valve from moving and allows the secondary inflation valve seal to move when the secondary valve actuator is in the second state.

According to some embodiments, methods of assembling solenoid-operated pressure-regulator modules are provided. The methods include coupling a command cavity outlet of a primary inflation valve to an inlet of a secondary valve actuator inlet, coupling a main cavity outlet of the primary valve to an inlet of a secondary valve, coupling the secondary valve actuator to the secondary valve such that it prevents flow through the secondary valve from the inlet of the secondary valve to an outlet of the secondary valve when the secondary valve actuator is in a first state, and coupling a solenoid between the main cavity and the command cavity such that the solenoid selectively allows a gas that is in either the main cavity or in a pressure vessel connected to the primary inflation valve to flow into the command cavity. In operation, when the solenoid allows the gas to flow, the gas causes the main valve to open and causes the secondary valve actuator to enter a second state where it does not prevent flow through the secondary valve.

In addition to one or more of the features described above, or as an alternative, further embodiments of the methods may include coupling a pressure regulator to the outlet of the secondary valve such that the pressure regulator controls the gas flow through the pressure regulator.

In addition to one or more of the features described above, or as an alternative, further embodiments of the methods may include coupling an inflatable slide to the pressure regulator such that the pressure regulator controls the gas flow into the inflatable slide.

In addition to one or more of the features described above, or as an alternative, further embodiments of the methods may include coupling the primary inflation valve to a gas source.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed systems and methods are presented herein by way of exemplification, and not limitation, with reference to the Figures.

Disclosed herein are solenoid-operated pressure-regulator modules that may solve or reduce one or more of the above discussed issues in addition to provide other advantages and features, as described in more detail below. For example, embodiments disclosed herein provide for actuation of two inflation valves by the use of a single solenoid valve, such as to enable inflation of an inflatable slide on an aircraft.

As will be described below, the solenoid-operated pressure-regulator modules of the present disclosure are configured to be operated electrically using a solenoid and includes at least a primary inflation valve and a secondary inflation valve. In some embodiments, the primary inflation valve is a poppet-type pneumatic valve with pressure balancing features in valve cavities of the primary inflation valve. When transitioning from a closed state to an open state (i.e., for deployment), the solenoid actuates the primary and secondary inflation valves in a single operation. Once the primary and secondary inflation valves are opened fully, by the operation of the solenoid, the opened position of the primary and secondary inflation valves will be sustained by a fluid pressure force inside the respective valves. A solenoid-operated pressure-regulator module operating two inflation valves, as described herein, can reduce leaking and allow for a more compact configuration to improve, for example, aircraft door design as compared to prior configurations.

Figure 1:
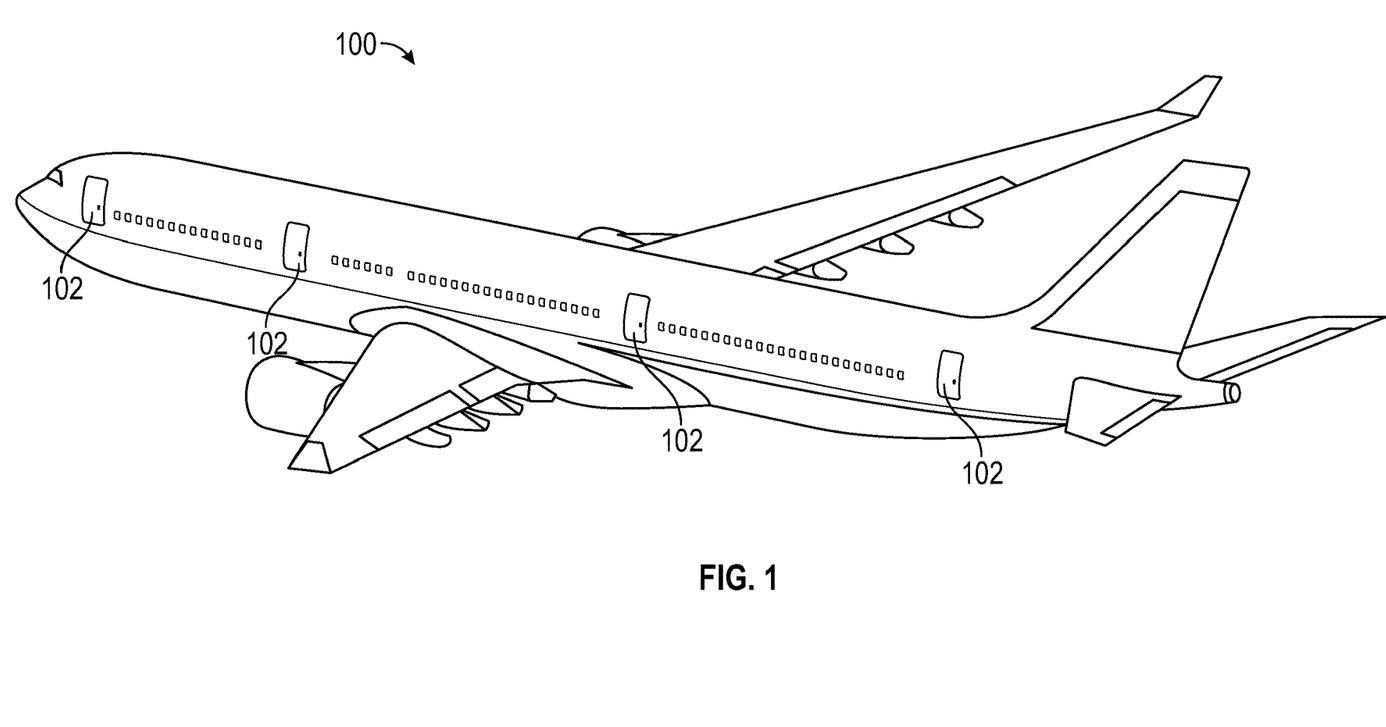
FIG. 1 is a schematic illustration of an example of an aircraft on which embodiments disclosed herein can be implemented.

FIG. 1 illustrates an example of an aircraft 100 that is suitable for use with embodiments disclosed herein. The specific arrangement of the aircraft 100 shown is not to be limiting, and other aircraft designs and configurations may employ embodiments described herein, without departing from the scope of the present disclosure. The illustrated aircraft 100 includes doors 102 used by passengers for entering and exiting the aircraft. The doors 102 may be used for both ingress to and egress from the aircraft 100, and may also be configured and used as emergency exits.

Figure 2:
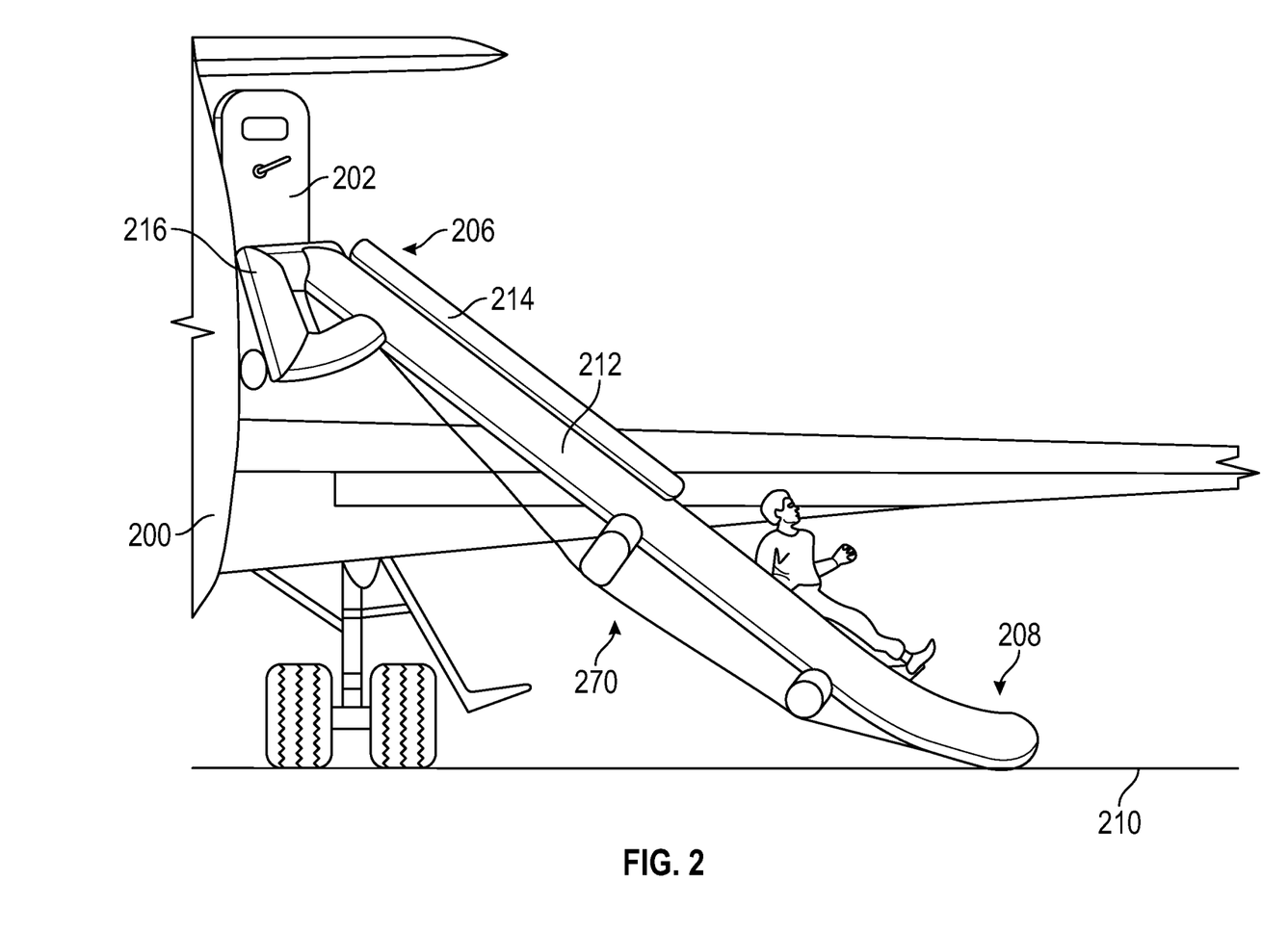
FIG. 2 is a schematic illustration an inflatable slide in a deployed state, which may incorporate features of the disclosed embodiments.

Turning to FIG. 2, an inflatable slide 270 of an aircraft 200 in a deployed state is shown. The inflatable slide 270 extends from the aircraft 200 and is inflated to enable evacuation egress for passengers from the aircraft 200. The inflatable slide 270, as shown, includes a head end 206 and a foot end 208. The head end 206 is configured to couple the inflatable slide 270 to a portion of the aircraft 200, such as at a door 202, while the foot end 208 is configured to contact a ground surface 210 such that the inflatable slide 270 provides a sloping surface to permit rapid egress of passengers from the aircraft 200. In some embodiments, the inflatable slide 270 may be fabricated from an air impervious material, such as a lightweight fabric, that has been coated with an elastomer, such as rubber or urethane. The various parts of the inflatable slide 270 may be joined together with a suitable adhesive whereby the structure will form a unitary composite structure of chambers capable of maintaining a substantially constant shape during operation (i.e., when deployed). The entire structure of the inflatable slide 270 is preferably formed such that all the chambers comprising the structure are interconnected pneumatically. Accordingly, a single pressurized gas source can be employed to deploy the inflatable slide 270. Examples of pressurized gas sources can include, without limitation, compressed carbon-dioxide, compressed nitrogen, compressed argon, pyrotechnic gas generators, or a hybrid gas generator consisting of stored compressed gas and a pyrotechnic gas generator. A plurality of inflatable beams 212 are arranged to form a main body of the inflatable slide 270. A pair of longitudinally extending rail tubes 214 are arranged along the sides of the main body and extend from a head end truss assembly 216 at the head end 206.

Figure 3:
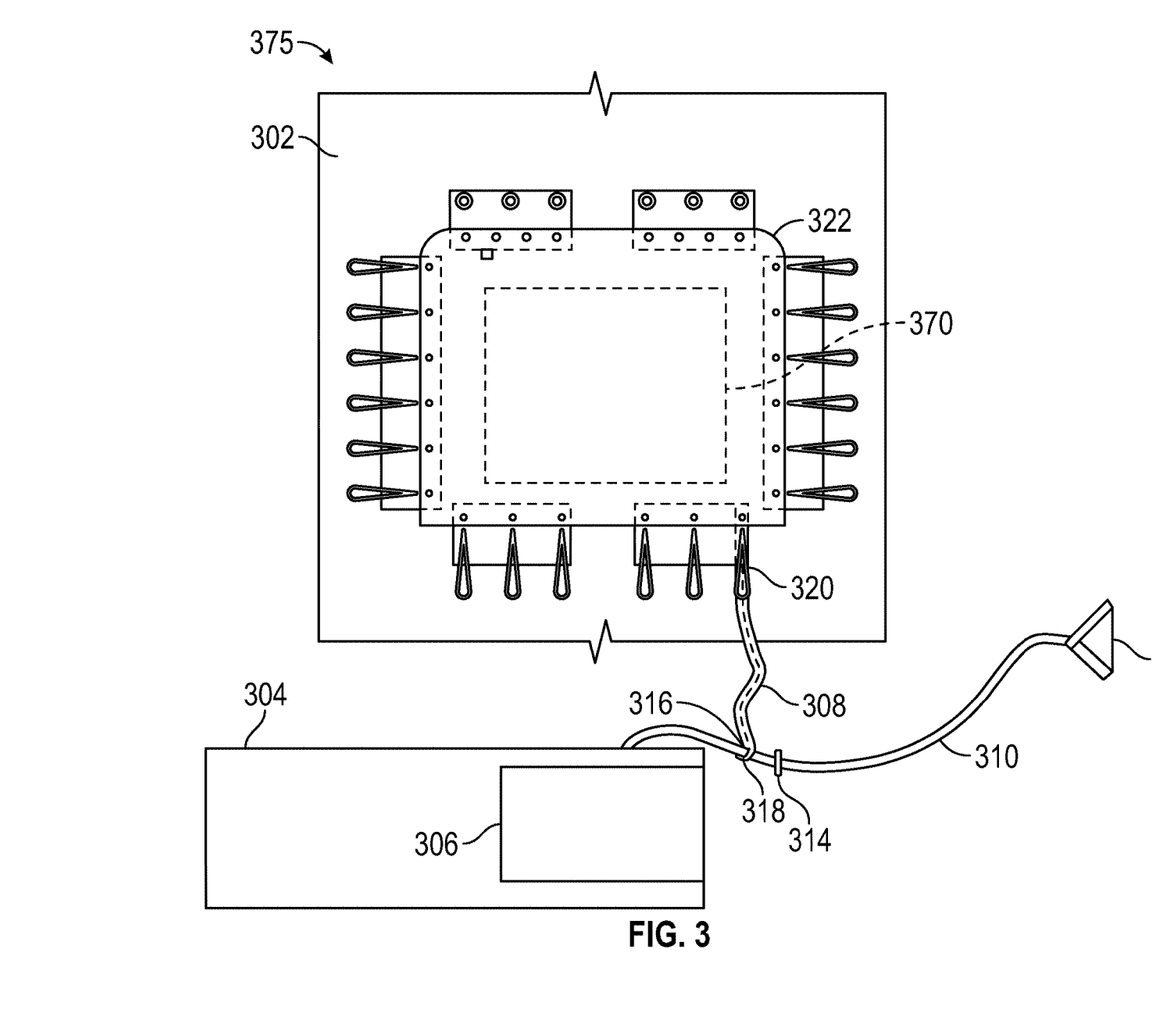
FIG. 3 is a schematic illustration of an inflatable slide assembly that is installed to a portion of an aircraft.

FIG. 3 schematically shows an inflatable slide assembly 375. The inflatable slide assembly 375 includes an inflatable slide 370 stored in an undeployed condition in a housing 322. In this illustrative embodiment, the housing 322 is mounted on or adjacent to an interior of an aircraft door 302. The inflatable slide assembly 375, as shown, includes an inflator 304 that is associated with the inflatable slide 370. The inflator 304 is configured to contain and/or control a supply of gas to be supplied to the inflatable slide 370. Such gas may be sourced form a compressed gas container, a pyrotechnic gas generator, or a hybrid inflation system consisting of a stored compressed gas and a pyrotechnic gas generator, or other existing or future source of inflation gas. The inflator 304 includes an inflation valve 306 that is configured to enable inflation of the inflatable slide 370 when transitioning from a normally closed state to an open state. The inflation valve 306 is operated by operating either an automatic initiation lanyard 308 or a manual initiation lanyard 310. In either case, the pulling on the lanyard 308, 310 will actuate or operate the inflation valve 306 to operate the inflator 304 and thus release compressed gas into the inflatable slide 370. The lanyards 308, 310 are interconnected, joined, or connected to the inflation valve 306 and/or the inflator 304 at a single operable connection point. As shown, the manual initiation lanyard 310 includes a pull handle 312 and a mechanical stop 314. The pull handle 312 may be a fabric loop, plastic handle, or other suitable handle to enable an operator (e.g., a flight attendant) to initiate inflation of the inflatable slide 370 in the event of a failure of the automatic inflation process, which employs the automatic initiation lanyard 308. The mechanical stop 314 may be a suitable ferrule crimped onto, a knot tied in, and/or other fitting attached to the manual initiation lanyard 310. A grommet 316 is configured to connect the automatic initiation lanyard 308 with the manual initiation lanyard 310. The grommet 316 reinforces a distal end 318 of the automatic initiation lanyard 308 which has a proximal end 320 attached to the housing 322. The housing 322 is configured to retain and/or house the inflator 304 and the inflatable slide 370 in the undeployed and uninflated condition for storage (and installed within an aircraft).

Embodiments of the present disclosure are directed to replacing the manual initiation lanyard, described above, with a solenoid-type system. That is, a more robust and efficient mechanism for inflating emergency inflatable slides for aircraft is described herein. The described systems can remove inefficiencies related to manual or human error in systems that rely upon manual initiation lanyards.

Figure 4:
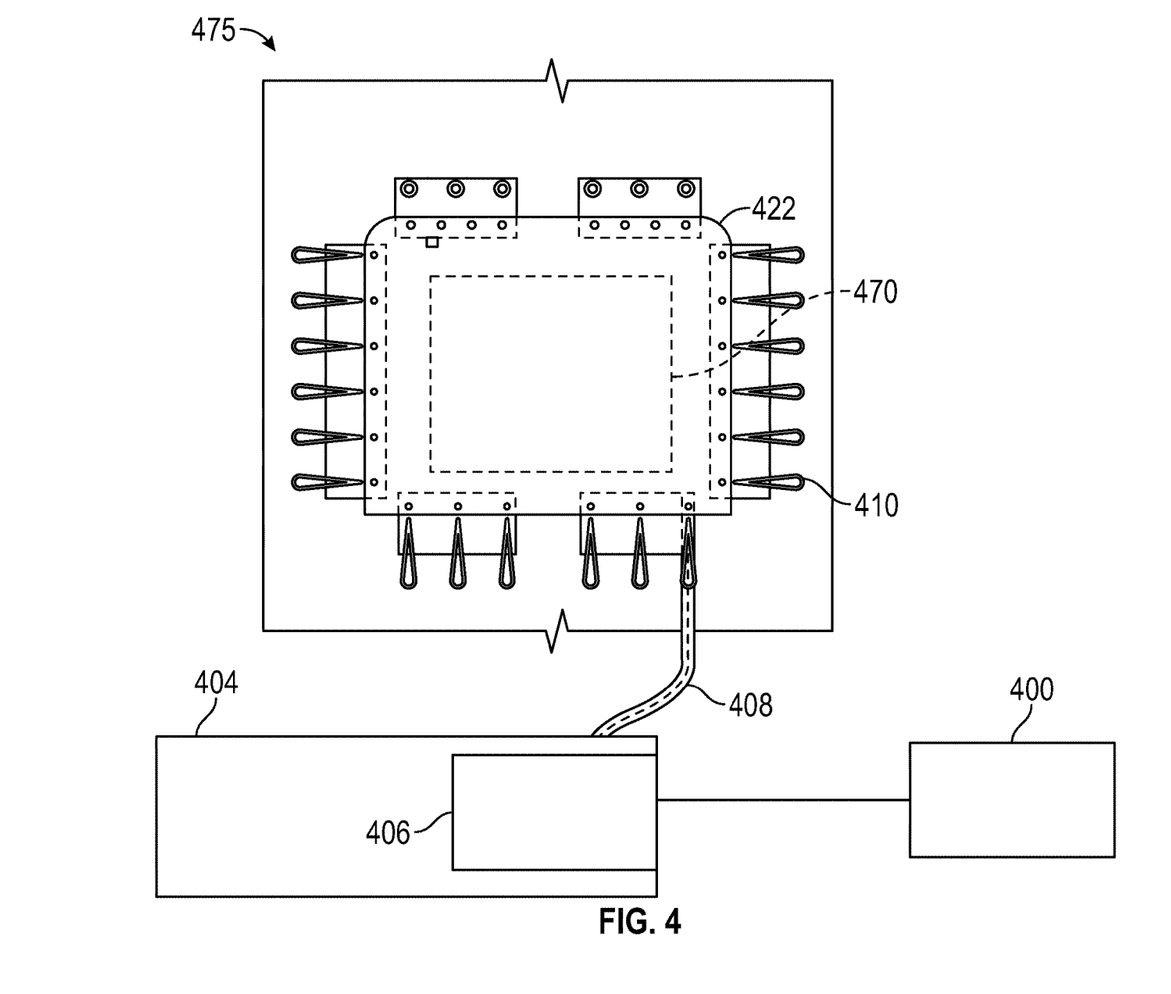
FIG. 4 is a schematic illustration of an inflatable slide assembly incorporating an embodiment of the present disclosure.

For example, turning to FIG. 4, a schematic illustration of an inflatable slide assembly 475 that includes embodiments of the present disclosure is shown. The inflatable slide assembly 475 includes an inflation valve 406 that is configured to be activated by an activator 400. The activator 400 is configured to initiate the inflation of an inflatable slide 470, such as an inflatable evacuation slide used on an airplane, in the event that an automatic initiation does not occur. The activator 400 may be, in some configurations, a mechanical, electrical, or electromechanical actuator, such as a pull cord, lever, electronic switch, button, etc. As shown in the configuration of FIG. 4, an optional initiation lanyard 408 (e.g., an automatic initiation lanyard) attaches an inflator 404 to the inflatable slide 470. A housing 422 is configured to retain and/or house the inflator 404 and the inflatable slide 470 in an undeployed and uninflated or folded state for storage by means of one or more fasteners 410, such as lacing, straps, etc. In this illustrative embodiments, the initiation lanyard 408 can be used in combination with the operation of a solenoid to provide for automatic activation of the inflation valve 406 and deployment of the inflatable slide 470. The automatic activation of the inflation valve 406 by way of the initiation lanyard 408 in combination with the operation of a solenoid is not to be limiting, and other configurations may be employed, without departing from the scope of the present disclosure. That is, the present illustration is merely for illustrative and explanatory purposes and is not intended to be limiting.

The inflator 404 may be a valve or valve assembly that is maintained in a closed state until activated. Such valves may be in the form of spool-type or poppet-type valves, with such valves being relatively complex in design. Furthermore, such valves may become more challenging to actuate when utilized in an environment with relatively large gas pressures, such as, for example, when fitted to inflate larger evacuation slides (e.g., large aircraft, over-wing, etc.). In view of the constraints of known valve designs, solenoid-operated pressure-regulator modules are described herein.

Figure 5A:
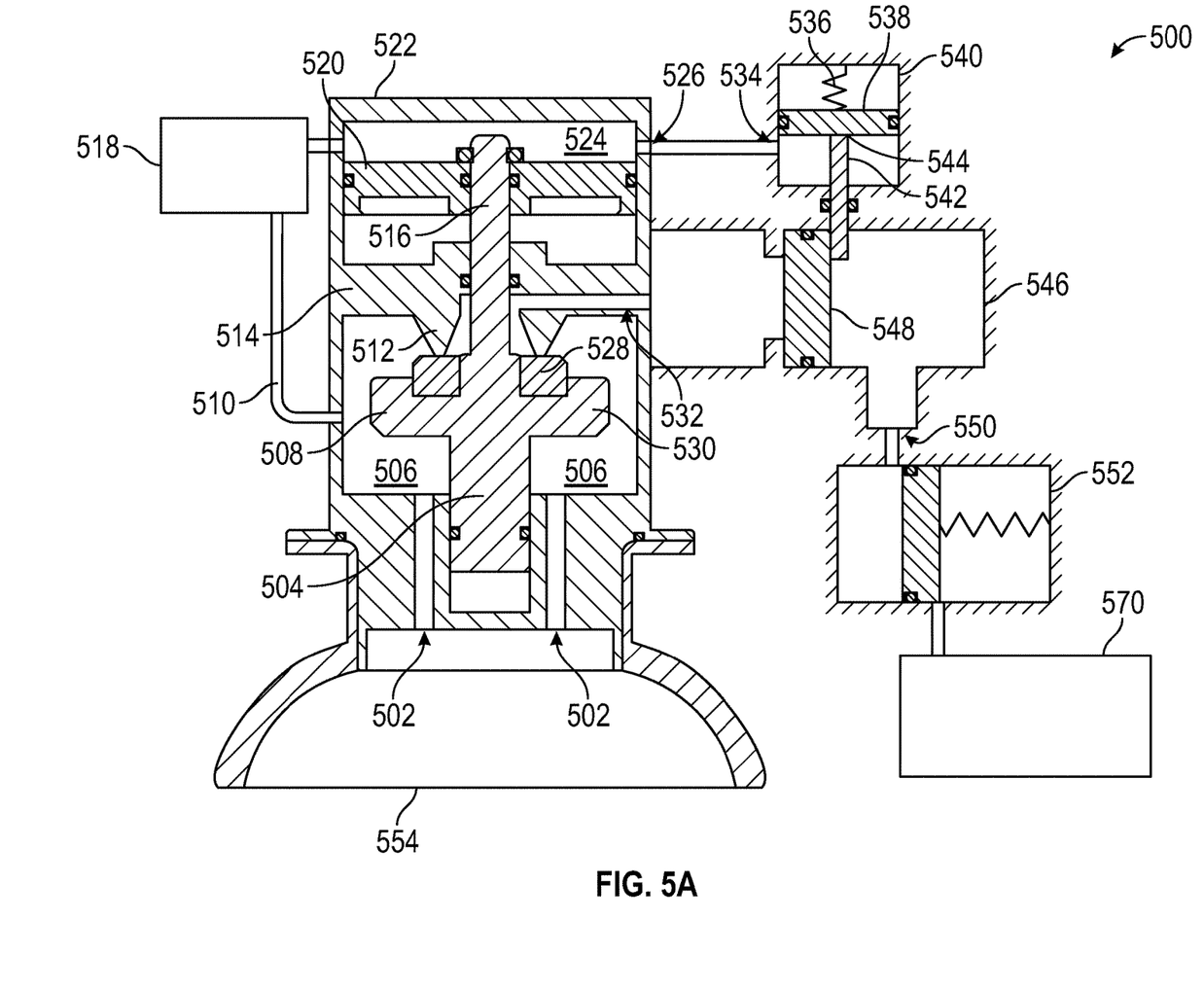
FIG. 5A is a side schematic illustration of a solenoid-operated pressure-regulator module in a closed condition in accordance with an embodiment of the present disclosure.
Figure 5B:
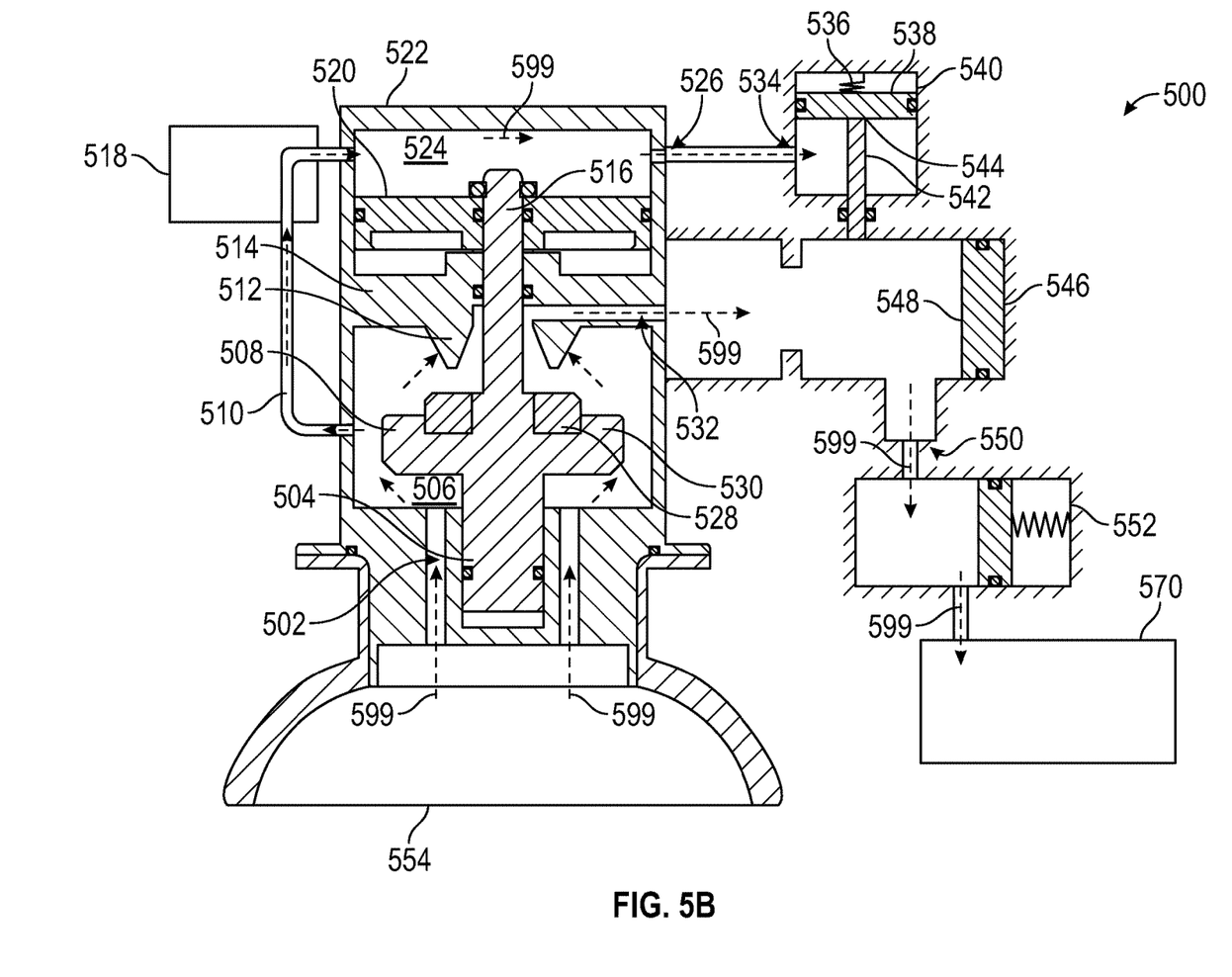
FIG. 5B is a side schematic illustration of the solenoid-operated pressure-regulator module of FIG. 5A in an open condition.

Turning now to FIGS. 5A and 5B, schematic illustrations of a solenoid-operated pressure-regulator module 500 in accordance with an embodiment of the present disclosure are shown. FIG. 5A illustrates the solenoid-operated pressure-regulator module 500 in a first state (e.g., closed or ready state). In the first state, the solenoid-operated pressure-regulator module 500 is configured to prevent airflow therethrough. In contrast, FIG. 5B illustrates the solenoid-operated pressure-regulator module 500 in a second state (e.g., an open or activated state), wherein airflow can pass therethrough. The solenoid-operated pressure-regulator module 500 is configured to be attached to a gas source 554 and retain gas therein in the first state. When the solenoid-operated pressure-regulator module 500 is activated by operation of an automatic initiation lanyard or by operation of a solenoid 518, the solenoid-operated pressure-regulator module 500 will transition from the first state to the second state.

As noted, FIG. 5A is a schematic illustration of the solenoid-operated pressure-regulator module 500 in the first state (i.e., closed or ready state). The solenoid-operated pressure-regulator module 500 may be integrated into an inflatable slide inflation system of an aircraft. As such, the solenoid-operated pressure-regulator module 500 may be configured to connect to the gas source 554 and be configured to enable selective flow of a compressed gas to inflate an inflatable slide 570. The inflatable slide assembly, that incorporates the solenoid-operated pressure-regulator module 500, may include a typical emergency evacuation slide, as discussed above, a large over-wing dual-slide, or other type of inflatable slide, as will be appreciated by those of skill in the art. In accordance with embodiments of the present disclosure, the solenoid-operated pressure-regulator module 500 is operated electrically using the solenoid 518. The solenoid-operated pressure-regulator module 500 includes a primary inflation valve 522, a secondary inflation valve 546, a secondary valve actuator 540, and a pressure regulator 552. The inflation valves 522, 546 are configured to control a flow of compressed air out of the gas source 554. The pressure regulator 552 provides for fluid connection to enable and control inflation of the inflatable slide 570. In some embodiments, the pressure regulator may be omitted, thus providing for a direction connection from the secondary inflation valve to the inflatable slide 570.

The primary inflation valve 522 is configured to directly connect to the gas source 554. Further, the secondary inflation valve 546 and the secondary valve actuator 540 are each fluidly connected to a portion of the primary inflation valve 522. The secondary inflation valve 546 is fluidly connected to the pressure regulator 552, which in turn is connected to an inlet of the inflatable slide 570. As such, the pressure regulator 552 is configured to control a gas flow 599 from the secondary inflation valve 546 to the interior of the inflatable slide 570 (e.g., as shown in FIG. 5B).

The primary inflation valve 522 includes a main cavity 506 separated from a command cavity 524 by a valve divider 514. The valve divider 514 substantially fluidly separates the main cavity 506 from the command cavity 524. The primary inflation valve 522 includes one or more inlets 502 at one end of the primary inflation valve 522, with this inlet-end of the primary inflation valve 522 configured to engage with the gas source 554. The inlet 502 is configured to enable a gas from the gas source 554 to enter the main cavity 506. In some embodiments, the inlet 502 is always open or unobstructed, although such configuration is not to be limiting. The primary inflation valve 522 further includes an outlet 532 that is arranged to fluidly connect the main cavity 506 to a portion of the secondary inflation valve 546. A valve seat 512 is arranged on the valve divider 514 and, as shown, extends into the main cavity 506 from the valve divider 514. The inlet 502 may be defined by one or more axially extending through-holes at the inlet-end of the primary inflation valve 522. As shown in the embodiment of FIGS. 5A-5B, the inlet 502 is formed of one or more channels, conduits, or passages that extend in a longitudinal direction of the primary inflation valve 522 and the outlet 532 is formed of one or more channels, conduits or passages that extend in a direction perpendicular to the inlet 502. As shown in FIGS. 5A-5B, the outlet 532 is configured as a conduit or channel formed in (and passing through) the valve divider 514, and fluidly connects the main cavity 506 of the primary inflation valve 522 to a portion of the secondary inflation valve 546.

To control the gas flow 599 through the primary inflation valve 522, a poppet 530 is arranged within the internal structure of the primary inflation valve 522. The poppet 530 includes a base 508, a first rod member 504 extending in a first direction from the base 508, and a second rod member 516 extending in a second (opposite) direction from the base 508. In the arrangement shown in FIGS. 5A-5B, the first rod member 504 extends toward the gas source 554 when the solenoid-operated pressure-regulator module 500 is attached to the gas source 554. The second rod member 516 extends away from the gas source 554 and through the valve divider 514. The second rod member 516 extends into the command cavity 524. A piston 520 is arranged within the command cavity 524 and coupled to the second rod member 516, with the piston 520 movable within the command cavity 524 by movement of the second rod member 516. In some embodiments, as shown, a diameter of the first rod member 504 may be larger than a diameter of the second rod member 516. The command cavity 524 is selectively fluidly connected between the main cavity 506 and the secondary valve actuator 540. As such, a fluid that is in contact with the piston 520 within the command cavity 524 may also flow from the command cavity 524 into the secondary valve actuator 540, and thus operate or actuate the secondary valve actuator 540.

In the first state, as shown in FIG. 5A, during normal use when the primary inflation valve 522 is closed, the outlet 532 is fluidly sealed from the main cavity 506 by the base 508 of the poppet 530 sealingly engaging with the valve seat 512. As shown, the poppet 530 includes a seal member 528 on the base 508 that is configured to sealingly engage with the valve seat 512 of the valve divider 514. In the first state, the gas source 554 is filled (charged) and the main cavity 506 is filled with gas from the gas source 554 and is at the same pressure as the gas source 554.

As discussed above, the solenoid-operated pressure-regulator module 500 includes a solenoid 518 that controls operation of the solenoid-operated pressure-regulator module 500. The solenoid 518 is configured to be electrically operated (i.e., energized) to control the gas flow 599 from the main cavity 506 to the command cavity 524. In a de-energized state (e.g., as shown in FIG. 5A), the solenoid 518 is configured to prevent flow from the main cavity 506 to the command cavity 524. However, when energized (e.g., as shown in FIG. 5B), such as by the press of a button or pull of a level or lanyard, the solenoid 518 will enable the gas flow 599 to flow from the main cavity 506 and enter the command cavity 524. When the gas flow 599 enters the command cavity 524, the solenoid-operated pressure-regulator module 500 transitions from the first (closed) state to the second (open) state, as described below.

The path of the gas flow 599 during operation, due to energizing the solenoid 518, passes from the main cavity 506, through a pilot pressure conduit 510, into the command cavity 524 (to perform work on the piston 520), and into the secondary valve actuator 540. The secondary valve actuator 540 includes an actuator inlet 534 that is fluidly coupled to a command cavity outlet 526 of the command cavity 524. An actuator piston 544 is arranged within the secondary valve actuator 540. The actuator piston 544 includes an actuator piston head 538 and an actuator rod member 542 that extends from the actuator piston head 538 and into a portion of the secondary inflation valve 546. In the first state, the actuator rod member 542 extends into the secondary inflation valve 546 to block movement of a secondary inflation valve seal 548. The secondary inflation valve seal 548 may block or otherwise prevent any leaking gas from the primary inflation valve 522 that may pass the seal member 528 from entering to the pressure regulator 552 and the inflatable slide 570, when in the first state. In some embodiments, a biasing element 536 is arranged to bias the actuator piston 544 into the blocking state (first state) such that the secondary inflation valve seal 548 is retained to block flow through the secondary inflation valve 546. That is, during normal use when the primary inflation valve 522 is closed, the secondary valve actuator 540 prevents the opening of the secondary inflation valve 546. As such, in the first (closed) state, the secondary valve actuator 540 (and the actuator rod member 542 thereof) in combination with the secondary inflation valve seal 548 obstruct the gas flow 599 into the secondary inflation valve 546. Accordingly, this configuration can reduce gas leaks into the inflatable slide 570 and/or from the solenoid-operated pressure-regulator module 500.

In some configurations, the secondary inflation 546 valve may be a spool-type or poppet-type valve, for example. The pressure regulator 552 is fluidly coupled to a secondary valve outlet 550 of the secondary inflation valve 546. The pressure regulator 552, as noted, can control a flow of fluid from the secondary inflation valve 546 to the inflatable slide 570.

Turning now to FIG. 5B, a schematic illustration of the of the solenoid-operated pressure-regulator module 500 in the second (open) state (and the gas flow 599 therethrough) is shown. As noted above, the transition from the first (closed) state to the second (open) state is achieved by energizing the solenoid 518. By energizing the solenoid 518, gas from within the main cavity 506 will flow through the pilot pressure conduit 510 and into the command cavity 524. The gas that enters the command cavity 524 will apply fluid pressure upon the piston 520 and urge the piston 520 downward (in FIGS. 5A-5B) and toward the main cavity 506. This causes the poppet 530, through the connection between the piston 520 and the second rod member 516, to move downward and cause the seal member 528 to disengage from the valve seat 512. When the seal member 528 is separated from the valve seat 512, a fluid connection between the main cavity 506 and the outlet 532 of the primary inflation valve 522 will be formed, thus allowing flow from the main cavity 506 into a portion of the secondary initiation valve 546.

At the same time, a portion of the gas flow 599 within the command cavity 524 will flow into the secondary valve actuator 540. The gas pressure within the secondary valve actuator 540 will apply force to the actuator piston head 538 and overcome the biasing force of the biasing element 536. As the actuator piston head 538 moves within the secondary valve actuator 540 (i.e., upward on the page), the actuator rod member 542 will be retracted from the secondary inflation valve 546. When the actuator rod member 542 is removed, the secondary inflation valve seal 548 will be forced to open due to a fluid pressure applied by gas that is flowing through the outlet 532. The secondary inflation valve seal 548 will be moved to open a fluid path from the outlet 532, through the secondary inflation valve 546, into the pressure regulator 552, and subsequently into the inflatable slide 570 to inflate an inflatable slide thereof.

Accordingly, as described above, operation of the solenoid 518 enables operation of both the primary inflation valve 522 and the secondary inflation valve 546 simultaneously or substantially simultaneously. That is, because the solenoid 518 is arranged between the main cavity 506 on one side and the command cavity 524 and the secondary valve actuator 540 on the other side (i.e., by means of the selectively openable pilot pressure conduit 510), the single operation of the solenoid 518 enables operation of both valves with one mechanism. Advantageously, because the solenoid 518 is an electrical component, ease of use and operation is enabled. Moreover, because the system includes such solenoid switch for open/close states of the pilot pressure conduit 510, operation of the solenoid 518 itself may be catered to various different configurations. For example, an electrical connection from a push button, switch, or lever may be provided for relatively simple operation of the solenoid 518 and thus the solenoid-operated pressure-regulator module 500 by an operator, and, in turn, inflation of an inflatable slide. It will be appreciated that, in some configurations, a mechanical connection, such as a pull cord or lanyard, may be operably connected to the solenoid 518 to enable operation as described above.

Figure 6:
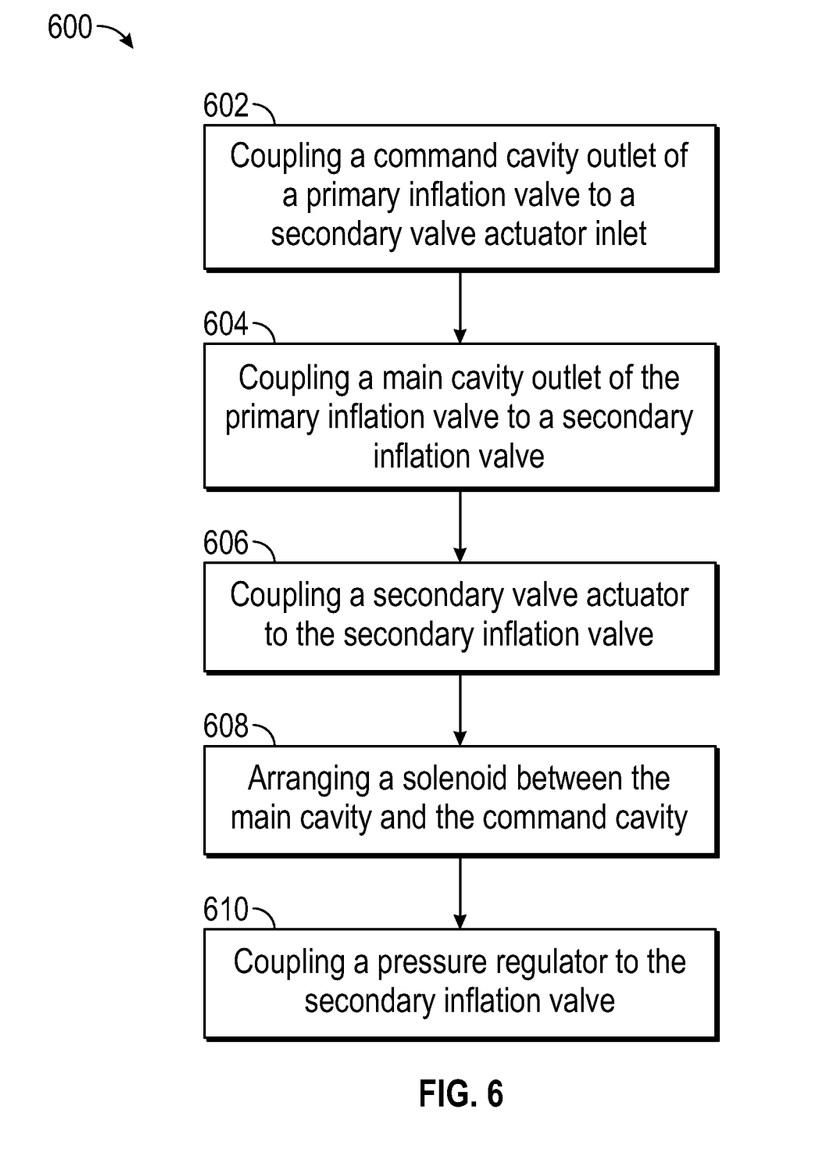
FIG. 6 is a flow process for assembling a solenoid-operated pressure-regulator module in accordance with an embodiment of the present disclosure.

Turning now to FIG. 6, a flow process 600 for a method of manufacturing or assembling a solenoid-operated pressure-regulator module in accordance with an embodiment of the present disclosure is shown. The flow process 600 may be employed to manufacture or assembly a solenoid-operated pressure-regulator module as shown and described above, such as with respect to FIGS. 5A-5B. However, it will be appreciated that the flow process 600 may be employed to manufacture solenoid-operated pressure-regulator modules having different and/or alternative features, components, and/or arrangements thereof, without departing from the scope of the present disclosure.

As illustrated in FIG. 6, at block 602 of the flow process 600, a command cavity outlet of a primary inflation valve is coupled to an inlet of a secondary valve actuator inlet. For example, a primary inflation valve having a command cavity and a main cavity may be employed, such as shown and described above. At block 602, a fluid connection is established between such command cavity and a portion of a secondary valve actuator (e.g., at the inlet of the secondary valve actuator).

At block 604, a main cavity outlet of the primary inflation valve is coupled to a secondary inflation valve. For example, the main cavity outlet may be arranged to fluidly connect the main cavity of the primary inflation valve to a portion of the secondary inflation valve to allow a gas to flow from a gas source to an inflatable slide when transitioning from a first state to a second state, such as shown and described above. In the first state, and as coupled, the fluid connection between the main cavity and the secondary inflation valve is selectively sealed closed (e.g., using a seal member). However, the seal member is arranged to be selectively removed from the sealing position to enable fluid connection between the main cavity and the secondary inflation valve.

At block 606, the secondary valve actuator is coupled to the secondary inflation valve such that the secondary valve actuator prevents flow through the secondary inflation valve to an outlet of the secondary valve when the secondary valve actuator is in a first state. In the first state, in some embodiments, the coupling of the secondary valve actuator to the secondary inflation valve includes the use of a piston or actuator rod member that can selectively engage with, secure, or otherwise block movement of a secondary inflation valve seal within the secondary inflation valve. When transitioning from the first state to the second state, a gas can flow from the command cavity to the secondary valve actuator thereby activating the piston. In doing so, the gas can flow from the primary inflation valve through the secondary inflation valve to a secondary inflation valve outlet.

At block 608, a solenoid is arranged between the main cavity and the command cavity of the primary inflation valve. The solenoid is configured to selectively allow the gas to flow into the command cavity. In some embodiments, the solenoid may be arranged along or in a pilot pressure conduit that provides a conduit from the main cavity to the command cavity. The solenoid is arranged to selectively control a gas flow from the main cavity into the command cavity. When the gas flow enters the command cavity, the gas will act upon a piston of the primary inflation valve. Additionally, such gas will flow to the secondary actuator valve inlet to cause the secondary valve actuator to transition to a second state and enable opening of the secondary inflation valve. As the secondary inflation valve opens, the gas will flow through the secondary inflation valve.

At block 610, an optional pressure regulator can be coupled to the secondary inflation valve outlet. The pressure regulator is configured to control the gas flow to an inflatable slide. For example, when transitioning from the first state to the second state, the activation of the piston allows for movement of a secondary inflation valve seal thereby opening a fluid path to the pressure regulator. The pressure regulator may subsequently control the gas flow into the inflatable slide.

As noted, in some embodiments, the inflatable slide can be coupled to the pressure regulator or to the outlet of the secondary valve. Furthermore, once the solenoid-operated pressure-regulator module is assembled as described in FIG. 6, the primary inflation valve may be coupled to a gas source capable of supplying a gas flow to an inflatable slide of an inflatable slide assembly in which the assembled solenoid-operated pressure-regulator module is incorporated.

Advantageously, as described herein, improved and efficient mechanisms for inflating emergency inflatable slides for vehicles are provided. The described solenoid-operated pressure-regulator modules employ a single solenoid to operate both primary and secondary inflation valves, which can improve fluid sealing of the system, and thus reduce leaks. Furthermore, the solenoid-operated pressure-regulator modules disclosed herein can eliminate manual cable pulls, thereby improving inflation system functionality on aircrafts. Moreover, such elimination of the manual cable pulls can reduce failure rates associated with such prior configurations (e.g., wear or failure of a manual pull lanyard).

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A solenoid-operated pressure-regulator module for an aircraft inflation system, comprising:
   a primary inflation valve having a main cavity, a command cavity, an inlet through which a gas enters the main cavity, an outlet, a poppet that controls a gas flow from the inlet to the outlet, and a valve divider separating the main cavity from the command cavity;
   a secondary inflation valve fluidly coupled to the outlet of the primary inflation valve;
   a secondary valve actuator having an actuator inlet fluidly coupled to an outlet of the command cavity, wherein the secondary valve actuator, in a first state, prevents opening of the secondary inflation valve and obstructs the gas flow into the secondary inflation valve and in a second state allows the secondary inflation valve to open; and
   a solenoid that controls the gas flow into the command cavity and actuator inlet of secondary valve actuator to cause the secondary valve actuator to enter the second state and allows, opening of the secondary inflation valve thereby allowing the gas flow to flow through the secondary inflation valve.

2. The solenoid-operated pressure-regulator module according to claim 1, further comprising a pilot pressure conduit connecting the main cavity to the command cavity.

3. The solenoid-operated pressure-regulator module according to claim 1, wherein the solenoid is configured to selectively control the gas flow from the main cavity to the command cavity.

4. The solenoid-operated pressure-regulator module according to claim 1, further comprising a pressure regulator coupled to an outlet of the secondary inflation valve.

5. The solenoid-operated pressure-regulator module according to claim 1, further comprising a valve seat arranged on the valve divider, wherein the poppet selectively sealingly engages with the valve seat to prevent the gas from flowing from the main cavity to the outlet of the primary inflation valve.

6. The solenoid-operated pressure-regulator module according to claim 1, wherein the poppet includes a base, a first rod member extending from the base in a first direction and into the main cavity, and a second rod member extending in a second direction from the base through the valve seat and into the command cavity, the solenoid-operated pressure-regulator module further comprising a piston coupled to the second rod member and disposed in the command cavity.

7. The solenoid-operated pressure-regulator module according to claim 1, wherein the solenoid is configuration to be electrically activated.

8. The solenoid-operated pressure-regulator module according to claim 1, wherein the secondary valve actuator further includes an actuator piston having an actuator piston head and an actuator rod member extending from the head and is arranged such that when the secondary valve actuator is in the first state it blocks a secondary inflation valve seal of the secondary inflation valve from moving and allows the secondary inflation valve seal to move when the secondary valve actuator is in the second state.

9. An inflatable slide assembly comprising:
   an inflatable slide;
   a gas source; and
   a solenoid-operated pressure-regulator module arranged between the gas source and the inflatable slide, the solenoid-operated pressure-regulator module configured to selectively enable fluid connection between the gas source and the inflatable slide to enable inflation of the inflatable slide, wherein the solenoid-operated pressure-regulator module comprises:
      a primary inflation valve having a main cavity, a command cavity, an inlet through which a gas enters the main cavity, an outlet, a poppet that controls a gas flow from the inlet to the outlet, and a valve divider separating the main cavity from the command cavity;
      a secondary inflation valve fluidly coupled to the outlet of the primary inflation valve;
      a secondary valve actuator having an actuator inlet fluidly coupled to an outlet of the command cavity, wherein the secondary valve actuator, in a first state, prevents opening of the secondary inflation valve and obstructs the gas flow into the secondary inflation valve and in a second state allows the secondary inflation valve to open; and
      a solenoid that controls the gas flow into the command cavity and actuator inlet of secondary valve actuator to cause the secondary valve actuator to enter the second state and allows, opening of the secondary inflation valve thereby allowing the gas flow through the secondary inflation valve.

10. The inflatable slide assembly according to claim 9, further comprising a pilot pressure conduit connecting the main cavity to the command cavity.

11. The inflatable slide assembly according to claim 9, wherein the solenoid is configured to selectively control fluid flow from the main cavity to the command cavity.

12. The inflatable slide assembly according to claim 9, further comprising a pressure regulator coupled to an outlet of the secondary inflation valve.

13. The inflatable slide assembly according to claim 9, further comprising a valve seat arranged on the valve divider, wherein the poppet selectively sealingly engages with the valve seat to prevent the gas from flowing from the main cavity to the outlet of the primary inflation valve.

14. The inflatable slide assembly according to claim 9, wherein the poppet includes a base, a first rod member extending from the base in a first direction and into the main cavity, and a second rod member extending in a second direction from the base through the valve seat and into the command cavity, the solenoid-operated pressure-regulator module further comprising a piston coupled to the second rod member and disposed in the command cavity.

15. The inflatable slide assembly according to claim 9, wherein the solenoid-operated pressure-regulator module and the gas source are arranged as an inflator that is operably connected to the inflatable slide.

16. The inflatable slide assembly according to claim 9, wherein the secondary valve actuator further includes an actuator piston having an actuator piston head and an actuator rod member extending from the head and is arranged such that when the secondary valve actuator is in the first state it blocks a secondary inflation valve seal of the secondary inflation valve from moving and allows the secondary inflation valve seal to move when the secondary valve actuator is in the second state.

17. A method of assembling a solenoid-operated pressure-regulator module, the method comprising:
   coupling a command cavity outlet of a primary inflation valve to an inlet of a secondary valve actuator;
   coupling a main cavity outlet of the primary inflation valve to an inlet of a secondary inflation valve;
   coupling the secondary valve actuator to the secondary inflation valve such that it prevents flow through the secondary inflation valve from the inlet of the secondary inflation valve to an outlet of the secondary inflation valve when the secondary valve actuator is in a first state, wherein the secondary valve actuator, in the first state, prevents opening of the secondary inflation valve and obstructs the gas flow into the secondary inflation valve and in a second state allows the secondary inflation valve to open; and coupling a solenoid between the main cavity and the command cavity such that the solenoid selectively allows a gas that is either in the main cavity or in a pressure vessel connected to the primary inflation valve to flow into the command cavity;

wherein, in operation, when the solenoid allows the gas to flow, the gas causes the primary inflation valve to open and causes the secondary valve actuator to enter the second state.

18. The method of assembling a solenoid-operated pressure regulator module according to claim 17, further comprising:

coupling a pressure regulator to the outlet of the secondary inflation valve such that the pressure regulator controls the gas flow through the pressure regulator.

19. The method of assembling a solenoid-operated pressure regulator module according to claim 18, further comprising:

coupling an inflatable slide to the pressure regulator such that the pressure regulator controls the gas flow into the inflatable slide.

20. The method of assembling a solenoid-operated pressure regulator module according to claim 17, further comprising:

coupling the primary inflation valve to a gas source.

* * * * *